(12) United States Patent
Batelaan et al.

(10) Patent No.: US 6,627,751 B1
(45) Date of Patent: Sep. 30, 2003

(54) HYDROPHOBICALLY MODIFIED ANIONIC CELLULOSE ETHERS

(75) Inventors: Jan Gerardus Batelaan, Westervoort (NL); Berend Jan Dijk, Leusden (NL); Peter Marten Van Der Horst, Arnhem (NL)

(73) Assignee: Akko Nobel N.V., Arnhem (NL)

( * ) Notice: Subject to any disclaimer, the term of this patent is extended or adjusted under 35 U.S.C. 154(b) by 0 days.

(21) Appl. No.: 09/455,103

(22) Filed: Dec. 6, 1999

Related U.S. Application Data

(63) Continuation of application No. PCT/EP98/03709, filed on Jun. 10, 1998.

(30) Foreign Application Priority Data

Jun. 13, 1997 (EP) .............................. 97201816

(51) Int. Cl.$^7$ ...................... C08B 11/00; C08B 11/193; C08B 11/02; C07H 1/00
(52) U.S. Cl. .............................. 536/84; 536/56; 536/90; 536/92; 536/99; 536/100; 536/122; 536/123.1; 536/124
(58) Field of Search .............................. 536/30, 33, 43, 536/44, 56, 59, 32, 58, 69, 75, 83, 84, 90, 92, 99, 100, 122, 123.1, 124

(56) References Cited

U.S. PATENT DOCUMENTS

| | | | |
|---|---|---|---|
| 2,463,869 A | 3/1949 | Hamilton et al. | 260/209 |
| 4,228,277 A | 10/1980 | Landoll | 536/90 |
| 4,243,802 A | 1/1981 | Landoll | 536/91 |
| 5,120,838 A | 6/1992 | Just et al. | 536/90 |
| 5,124,445 A | 6/1992 | Just et al. | 536/84 |
| 5,504,123 A | 4/1996 | Partan, III | 524/42 |
| 5,566,760 A | 10/1996 | Harris | 166/308 |

FOREIGN PATENT DOCUMENTS

| | | | |
|---|---|---|---|
| DE | 554 877 | 6/1932 | ............... 12/6 |
| EP | 0 189 935 | 8/1986 | ......... C08B/11/193 |
| EP | 0 307 915 | 3/1989 | ......... C08B/11/193 |
| EP | 0 362 769 | 4/1990 | ......... C08B/11/193 |
| EP | 0 384 167 | 8/1990 | ........... C08B/37/00 |
| EP | 0 390 240 | 10/1990 | ......... C08B/11/193 |
| EP | 0 471 866 | 2/1992 | ......... C08B/11/163 |
| EP | 0 566 911 | 10/1993 | ............ C09D/7/00 |

OTHER PUBLICATIONS

*International Search Report*, dated Oct. 19, 1998.
*Abstract of Japan*, publication No. 09110901, publication date Apr. 28, 1997, *New Polysaccharid Derivative*.
*Journal of Applied Polymer Science, Characteristics of Carboxymethyl Cellulose Synthesized in Two–Phase Medium* $C_6H_6$—$C_2H_5OH$. I. *Distribution of Substituent Groups in the Anhydroglucose Unit*, Fa Cheng, Guifeng Li, Jianxin Feng, and Jingwu Zhang, vol. 61, pp. 1831–1838 (1996).

*Primary Examiner*—James O. Wilson
*Assistant Examiner*—Everett White
(74) *Attorney, Agent, or Firm*—Lainie E. Parker; Ralph J. Mancini

(57) ABSTRACT

A hydrophobically modified anionic cellulose ether obtainable by a process comprising reacting an alkali metal cellulose with at least three alkylating reagents A, B, and C. Reagent A is selected from the group of haloacetic acids, alkali metal haloacetates, alkali metal vinyl sulfonates, and vinyl sulfonic acid. Reagent B has the formula $R^1$—$(OCH_2CH(R^2))_n$—P, wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and reagent C has the formula $R^3$—$(OCH_2CH(R^2))_m$—P, wherein $R^3$ represents a $C_8$–$C_{30}$ group, m is 0–10, and $R^2$ and P have the meaning as described above.

13 Claims, No Drawings

US 6,627,751 B1

HYDROPHOBICALLY MODIFIED ANIONIC CELLULOSE ETHERS

RELATED APPLICATION

This application is a continuation of PCT/EP98/03709 filed Jun. 10, 1998.

FIELD OF THE INVENTION

The invention relates to a hydrophobically modified anionic cellulose ether, such as hydrophobically modified carboxymethyl cellulose.

BACKGROUND OF THE INVENTION

Processes for preparing polysaccharides, such as cellulose, starch, and guar, having hydrophobic substituents are known in the art. For instance, EP-A-0384167 describes a slurry process, using a diluent system, for preparing water-soluble polysaccharides, in particular hydroxyethyl cellulose (HEC) derivatives, containing alkylaryl substituents having at least about 10 carbon atoms, for use in latex compositions.

The process comprises reacting an ether-substituted polysaccharide with an alkylaryl hydrophobe-containing compound. It is mentioned that as a result of reacting a polysaccharide ether with an alkylaryl hydrophobe, the ether substitution on the polysaccharide provides an increase in hydrophobic substitution as compared with the unsubstituted saccharide. Examples 35 and 36 of EP-A-0384167 show that when using nonylphenyl glycidyl ether a higher alkylarylation efficiency is observed with polysaccharides having a higher ethylene oxide (as hydroxyethyl) molar substitution (MS) value. MS is defined as the average moles of a substituent per mole of sugar repeating unit. With an ethylene oxide MS of 3.5 a hydrophobe MS of 0.059 with an efficiency of 24% was obtained, while with an ethylene oxide MS of 2.3 a hydrophobe MS of 0.025 with an efficiency of 10% was observed. The obtained hydrophobic substitution efficiency therefore is low.

Thus, a disadvantage of this process is that the hydrophobic substitution proceeds with a low efficiency, resulting in a waste of chemicals and a burden on the environment. A further drawback is that the efficiency with which hydrophobic groups are incorporated is dependent on the presence of hydroxyethyl groups per se and only increases with an increasing number of such groups. This is due to the fact that the hydroxyalkyl substituents are more prone to alkylation than the hydroxyl groups on the sugar repeating unit.

Processes for preparing hydrophobically derivatized polysaccharides are also known from EP-A-0566911 and EP-A-0307915. The process of EP-A-0566911 comprises reacting a polysaccharide with an alkyl halide, an alkylene oxide, or a chloroacetic acid in the presence of an alkali, reacting the modified polysaccharide with a hydrophobic alkyl or alkylaryl reagent having 8 to 24 carbon atoms and containing a nucleophilic reactive group selected from a glycidyl ether and an isocyanate, to produce a watersoluble, hydrophobically modified polysaccharide. This hydrophobically modified polysaccharide is subsequently depolymerized by reaction with hydrogen peroxide to the desired level. The following polysaccharides have been hydrophobically modified: poly(vinyl alcohol), carboxymethyl hydroxypropyl starch, methyl hydroxyethyl cellulose, methyl hydroxypropyl cellulose, hydroxypropyl guar, carboxymethyl hydroxyethyl cellulose, and HEC.

EP-A-0566911 describes, int. al., a slurry process in which use was made of stearyl isocyanate and nonylphenyl glycidyl ether. HEC was modified using hexadecyl glycidyl ether, and the weight percentage of hydrophobe in the (depolymerized) product was from 0.4 to 1.4% (Example 1). This corresponds to a low hydrophobe MS of approximately 0.005 and 0.02, respectively. A similarly low hydrophobe MS of approximately 0.01 was calculated for carboxymethyl hydroxyethyl cellulose (CMHEC) derivatized with hexadecyl glycidyl ether (Table 4, No. 13). Hydrophobic substitution efficiencies could not be calculated on the basis of information given in this publication, but these are estimated to be low as well.

EP-A-0307915 describes a process for preparing water-soluble hydrophobic CMHEC modified with an alkyl, α-hydroxyalkyl, or acyl group having 8 to 25 carbon atoms. In the Preparation Example the hexadecyl hydrophobe only represents 0.7 percent by weight of the cellulose. A hydrophobic substitution efficiency of 6.7% was calculated. The slurry process preferably is carried out by first hydroxyethylating the cellulose, then attaching the hydrophobe, and finally carboxymethylating the product. The processes of EP-A-0566911 and EP-A-0307915 have the same disadvantages as mentioned above for EP-A-0384167, i.e., a low hydrophobic substitution efficiency and the incorporation of hydroxyethyl groups. In particular, these publications do not disclose a process for preparing hydrophobically modified anionic cellulose ethers, e.g. hydrophobically modified carboxymethyl cellulose (CMC), not carrying a hydroxyalkyl group.

Several other processes have been described in the art, in particular relating to the preparation of hydrophobically modified non-ionic cellulose ethers, i.e. U.S. Pat. No. 4,228,277, U.S. Pat. No. 4,243,802, EP-A-0390240, U.S. Pat. No. 5,120,838, U.S. Pat. No. 5,124,445, EP-A-0362769, EP-A-0471866, and U.S. Pat. No. 5,504,123.

In U.S. Pat. No. 5,566,760 a process is described for the preparation of hydrophobically modified guar derivatives.

Finally, EP-A-0189935 describes water-soluble, hydrophobically derivatized, quaternary nitrogen-containing polysaccharides, in particular derived from HEC. Only quaternary ammonium cellulose derivatives are disclosed. HEC is hydrophobically modified by alkylation with a quaternary nitrogen-containing compound, such as 3-chloro-2-hydroxypropyl trimethyl ammonium chloride, and an alkylhalide hydrophobe, for example dodecyl bromide. In Run 35, a low hydrophobe MS of 0.016 was obtained. A hydrophobic substitution efficiency of 13% was calculated. However, it is not always desirable to incorporate a quaternary ammonium group into a hydrophobically modified polysaccharide.

SUMMARY OF THE INVENTION

The above-mentioned prior art does not disclose hydrophobically modified anionic cellulose ethers, in particular hydrophobically modified CMC, not carrying a hydroxyalkyl group. The present invention provides such ethers and an economical process for preparing them.

The inventive hydrophobically modified anionic cellulose ether is obtainable by a process comprising reacting an alkali metal cellulose not carrying a hydroxyalkyl group with at least three alkylating reagents A, B, and C, one or more reagents A being a haloacetic acid, alkali metal haloacetate, alkali metal vinyl sulfonate, or vinyl sulfonic acid, one or more reagents B having the formula $R^1$—$(OCH_2CH(R^2))_n$—P wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula

$$R^3\text{—}(OCH_2CH(R^2))_m\text{—}P$$

wherein $R^3$ represents a $C_8$–$C_{30}$ group, m is 0–10, and $R^2$ and P have the meaning as described above.

DETAILED DESCRIPTION OF THE INVENTION

The hydrophobically modified anionic cellulose ether according to the present invention is obtainable by a process comprising reacting an alkali metal cellulose with at least three alkylating reagents A, B, and C, one or more reagents A being selected from the group of haloacetic acids, alkali metal haloacetates, alkali metal vinyl sulfonates, and vinyl sulfonic acid, one or more reagents B having the formula

$$R^1\text{—}(OCH_2CH(R^2))_n\text{—}P$$

wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula

$$R^3\text{—}(OCH_2CH(R^2))_m\text{—}P$$

wherein $R^3$ represents a C8–$C_{30}$ group, m is 0–10, and $R^2$ and P have the meaning as described above.

The hydrophobically modified anionic cellulose ethers according to the present invention can be prepared from readily available cellulose starting materials. These materials include cotton linters and purified high-alpha wood pulp.

Typically, the cellulose is reacted with an aqueous solution of an alkali metal hydroxide to prepare the alkali metal cellulose. Suitable alkali metal hydroxides include sodium hydroxide, potassium hydroxide, and lithium hydroxide, with sodium hydroxide being preferred.

Suitable reagents A for the process of the present invention include chloroacetic acid, sodium chloroacetate, and sodium vinyl sulfonate. A mixture of, for example, chloroacetic acid and sodium vinyl sulfonate may also be used, and this results in the preparation of a hydrophobically modified carboxymethyl sulfoethyl cellulose. It is preferred that reagent A consists essentially of chloroacetic acid.

Suitable reagents B include benzyl chloride, allyl chloride, chloroethyl butyl ether, ethyl glycidyl ether, butylglycidyl ether, butoxyethyl glycidyl ether, tert-butyl glycidyl ether, iso-butyl glycidyl ether, allyl glycidyl ether, propyl glycidyl ether, isopropyl glycidyl ether, benzyl glycidyl ether, and benzyl halides. Preferably, P is a glycidyl ether group. It is also preferred that $R^2$ is hydrogen. Further, it is preferred that n equals 0. Preferred alkylating reagents B are butyl glycidyl ether and benzyl chloride.

Reagent C contains the hydrophobic group. The group $R^3$ preferably has 8 to 22, more preferably 12 to 22, carbon atoms. Reagents C suitable for the invention process include compounds wherein $R^3$ represents a nonylphenyl, 2-ethylhexyl, dodecyl, tetradecyl, hexadexyl, octadecyl or hexacosyl group. $R^3$ may be derived from (naturally occurring) fatty acids such as coconut, tallow, and hydrogenated tallow fatty acid. Reagent C may optionally contain one or more oxygen atoms in the form of ethyloxy or propyloxy groups. Typical examples thereof are tetradecyl-penta-oxyethyl glycidyl ether, hexadecyl-bis-oxyethyl glycidyl ether, and octadecyl-bis-oxyethyl glycidyl ether. Preferred alkylating reagents C are dodecyl glycidyl ether, tetradecyl glycidyl ether, hexadecyl glycidyl ether, octadecyl glycidyl ether, dodecyl-bis-oxyethyl glycidyl ether, tetradecyl-bis-oxyethyl glycidyl ether, hexadecyl-bis-oxyethyl glycidyl ether, octadecyl-bis-oxyethyl glycidyl ether, tetradecyl-penta-oxyethyl glycidyl ether, and mixtures thereof. Preferably, m is 0–5 and $R^2$ is hydrogen. It is to be noted that for n=1–2 and m=1–10 n and m are average numbers.

The process of the present invention may be conducted at any desired reaction temperature, typically between 20 and 125° C. and preferably from about 55 to 105° C., for a sufficient time to provide the desired level of hydrophobic substitution, typically from about 1 to 24 hours or more. The reaction may be conducted in a relatively large amount of diluent or with a minimal amount of diluent as desired, i.e., using either a so-called slurry or a so-called dry process.

In this specification, the term slurry process means a process wherein the weight ratio of liquid medium to cellulose is greater than 10, while a dry process means a process wherein the weight ratio of liquid medium to cellulose is equal to or smaller than 10, preferably smaller than 5, more preferably smaller than 3. Typically, a dry process is carried out in a high-efficiency intensive mixer, e.g. a plowshare mixer.

Suitable diluents include ethanol, isopropyl alcohol, tert-butyl alcohol, acetone, water, methyl ethyl ketone, and mixtures thereof.

The reaction can be carried out in any reaction vessel or reactor. The vessel or reactor is suitably equipped with a stirrer or mixing gear, a nitrogen inlet tube, a condenser, and facilities for heating. A particularly suitable reactor is a Drais® or a Lödige® reactor.

The molar ratio of alkali metal hydroxide per sugar repeating unit may vary depending on the alkylating agents used. Typically, a molar ratio of between 0.001 and 5 is used. Depending on the nature of the alkylating reagent(s) used, additional alkali metal hydroxide is added. For instance, when using chlorinated alkylating agents, e.g. chloroacetic acid, an additional molar equivalent of hydroxide is required. When using a glycidyl ether a catalytic amount of alkali metal hydroxide is sufficient.

Many polysaccharides when in contact with any base are readily degraded by oxygen. Accordingly, it is preferred to exclude oxygen from the reaction vessel during the time the alkali metal hydroxide is present. The reaction is suitably carried out in an atmosphere of an inert gas, preferably nitrogen.

After the reaction of the cellulose with a suitable amount of an aqueous solution of an alkali metal hydroxide, the alkali metal cellulose may be reacted first with alkylating reagent A, followed by a reaction with alkylating reagent B, and then C, or with a mixture of B and C, at a suitable temperature and for a time sufficient to provide the desired level of hydrophobic substitution. Alternatively, alkylating reagent B followed by C, or a mixture of B and C, may be added first, after which alkylating reagent A is allowed to react, or the alkali metal cellulose may be simultaneously reacted with alkylating reagents A, B, and C. It was found that if the alkali metal cellulose is reacted first with a mixture of B and C, and then with A, the first reaction step can be carried out in the presence of only water. A further alternative reaction path is to first add a small amount of reagent A, then reagents B and C, either sequentially or simultaneously, and finally the remainder of reagent A.

A preferred embodiment of the invention process is the reaction of the alkali metal cellulose first with a mixture of alkylating reagents B and C and then with reagent A, in particular when using chloroacetic acid.

It is preferred to carry out the process of the invention by means of the so-called dry process using a minimal amount of a suitable diluent, in particular water, that is, just enough to allow the polysaccharide to swell while preventing dissolution. The cellulose, in the form of fibres, linters or a powder, is allowed to react with an aqueous solution of an alkali metal hydroxide, i.e. the so-called alkalinization, and the obtained alkali metal cellulose is reacted with reagents A, B, and C as described above, with the temperature gradually being increased from about 10 to about 105° C. The reagents can be added pure or as a solution in a suitable diluent, e.g., a solution of chloroacetic acid in ethanol can suitably be used.

A particularly preferred process according to the invention comprises a dry process in which reagent B followed by C, or a mixture of B and C, is reacted with the alkali metal cellulose in the presence of water, prior to reaction with reagent A. Typically, the amount of water present during alkylation is between 2 and 12 moles per mole cellulose. Preferably, an amount of 3.5–10 moles/mole cellulose is used. The reaction with reagent A preferably is carried out in an aqueous alcohol medium, in particular it is performed in the presence of isopropanol or ethanol, with the water stemming from the alkalinization.

A person skilled in the art will readily be able to select suitable molar ratios of the reactants per sugar repeating unit for the invention process. For reagent A, a molar ratio of between 0.3 and 3.5 is suitable. A ratio of between 0.5 and 2.5 is preferred. For reagent B, a molar ratio of between 0.02 and 1.5 is suitable, a ratio of between 0.05 and 1 being preferred. For reagent C, a molar ratio of between 0.001 and 1 is suitable, preferably it is a ratio of between 0.005 and 0.5.

In another embodiment of the process of the present invention, a fourth alkylating reagent, i.e., a quaternary ammonium compound D, is used. Hydrophobically modified quaternary ammonium-containing poly-saccharides are known in the art, e.g., from EP-A-0189935. Typically, compound D is a 3-trialkylammonium-1,2-epoxypropane halide wherein each of the alkyl groups is a methyl, ethyl, benzyl, or long-chain alkyl group. Preferably, 3-trimethylammonium-1,2-epoxypropane chloride or 1-chloro-2-hydroxy-3-trimethylammoniumpropane chloride is used.

The hydrophobically modified celluloses of the present invention may be used in, for example, anti-settling, associative thickening, and in foam, emulsion, and suspension stabilizations. These celluloses are important for various industries including the drilling industry and paints, for example, latex compositions; cosmetics, such as shampoos; biomedicine, such as in oral care including toothpaste or in pharmaceuticals including timed-release formulations or controlled-release formulations; detergents, such as in laundry or surface cleaners; soil release; various other timed-release applications including pesticides; and other areas in which a protective colloid, stabilizer, emulsifier, thickener, or rheology modifier is desired.

The inventive process can also be used for the preparation of anionic hydrophobically modified polysaccharide ethers derived from hydroxyethyl cellulose, ethyl hydroxyethyl cellulose, guar, and starch. Using a combination of reagents B and C as described herein, non-ionic hydrophobically modified cellulose, hydroxyethyl cellulose, ethyl hydroxyethyl cellulose, guar, and starch can be prepared.

The invention is illustrated by the following examples.

EXPERIMENTAL

Materials

Linters Cellulose (0.5 mm milled), ex Buckeye
n-Butyl glycidyl ether, 95%, ex CFZ
Dodecyl/tetradecyl glycidyl ether, tech., ex Aldrich
Nafol®1214-2 EO glycidyl ether: a mixture of dodecyl-bis-oxyethyl glycidyl
ether and tetradecyl-bis-oxyethyl glycidyl ether, 85%
Nafol®1214, ex Condea
Isopropyl alcohol, 99.5%, ex Fluka
Ethanol, 95%, ex Baker
Sodium hydroxide, 50% in water, ex Acros
Chloroacetic acid, 99%, ex Akzo Nobel
Acetic acid, 99.8%, ex Baker
Benzyl chloride, 99%, ex Fluka Nafol®1214-2EO glycidyl ether was prepared according to the method described in EP-A-0390240 in Example A starting from a mixture of 1-dodecanol and 1-tetradecanol, i.e. Nafol®1214. Following the same method, tetradecyl-penta-oxyethyl glycidyl ether, a mixture of hexadecyl- and octadecyl-bis-oxyethyl glycidyl ether, and a mixture of dodecyl- and tetradecyl-bis-oxyethyl glycidyl ether were prepared from the corresponding (mixture of) alcohols.

The reactions were carried out in a Drais® Turbulent Mixer, type TR2.5, reactor. The knife blades were stirred at 180 rpm. The reactor was heated by a Thermomix UB water/oil bath.

The epoxide conversions were determined by titration using a Methrom 614 Impulsomat in combination with a Methrom 625 dosigraph or a Metrohm E536 potentiograph. The MS and DS values were determined using a 300 MHz Bruker NMR spectrometer, as specified by F. Cheng et al. in Journal of Applied Polymer Science, Vol. 61, 1831–1838 (1996). CM stands for carboxymethyl, BGE for n-butyl glycidyl ether, BEGE for butyloxyethyl glycidyl ether, and FAE for fatty (ethoxylated) alkyl ether. The efficiency of introducing the alkylating group into the polysaccharide is given as a percentage in parentheses behind the DS and MS values. The viscosities of a 1% solution of products were measured at room temperature and 30 rpm with a Brookfield LVT viscometer.

COMPARATIVE EXAMPLE A

About 50% of a solution of sodium hydroxide (80.8 g, 2.02 moles) in water (120 ml) was added to a stirred mixture of Linters Cellulose (150 g), 40 ml of water, and Nafol®1214-2EO glycidyl ether (120 g, 0.3 mole) under a nitrogen atmosphere at 20° C. After 1 hour the mixture was heated at 85° C. for 25 hours. The mixture was cooled, and 450 ml of ethanol, the remaining 50% of the sodium hydroxide solution, and a solution of chloroacetic acid (76.5 g, 0.8 mole) in 20 ml of ethanol were added. The mixture was heated at 80° C. for 90 minutes, cooled, and neutralized with acetic acid (24 g, 0.4 mole). The crude product was washed three times each with 65% ethanol, 80% ethanol, ethanol, and acetone, and was dried under reduced pressure at 70° C. for 24 hours. A white powder was obtained with the following analysis: $DS_{CM}$ 0.75 (83%), $MS_{FAE}$ 0.02 (6%), and a viscosity of 360 mPa·s (fair solubility in water).

EXAMPLE 1

About 30% of a solution of sodium hydroxide (80.8 g, 2.02 moles) in water (120 ml) was added to a stirred mixture of Linters Cellulose (150 g), 40 ml of water, n-butyl glycidyl ether (60 g, 0.4 mole), and Nafol®1214-2EO glycidyl ether (90 g, 0.22 mole) under a nitrogen atmosphere at 20° C. After 1 hour the mixture was heated at 85° C. for 25 hours. The mixture was cooled and 450 ml of ethanol, the remaining 70% of the sodium hydroxide solution, and a solution of chloroacetic acid (76.5 g, 0.8 mole) in 20 ml of water were added. The mixture was heated at 80° C. for 90 minutes, cooled, and neutralized with acetic acid (24 g, 0.4 mole). The crude product was washed three times each with 65% ethanol, 80% ethanol, ethanol, and acetone, and was dried under reduced pressure at 70° C. for 24 hours. A white powder was obtained with the following analysis: $DS_{CM}$ 0.75 (83%), $MS_{BGE}$ 0.23 (51%), and $MS_{FAE}$ 0.09 (36%). The product swells but is insoluble in water.

COMPARATIVE EXAMPLE B

A solution of sodium hydroxide (80.8 g, 2.02 moles) in 120 ml of water was added to a stirred mixture of Linters Cellulose (150 g) and 40 ml of water under a nitrogen atmosphere at 20° C. A solution of chloroacetic acid (75.6 g, 0.8 mole) in water (20 ml) and Nafol®1214-2EO glycidyl ether (120 g, 0.3 mole) were added after 17 hours. The mixture was heated at 85° C. for 26 hours. The mixture was cooled and neutralized with 24 g (0.4 mole) acetic acid. The crude product was washed three times each with 65% ethanol, 80% ethanol, ethanol, and acetone, and was dried under reduced pressure at 70° C. for 24 hours. A white powder was obtained with the following analysis: $DS_{CM}$ 0.64 (71%), $MS_{FAE}$ 0 (0%), and a viscosity of 5800 mPa·s.

EXAMPLE 2

A solution of sodium hydroxide (80.8 g, 2.02 moles) in 120 ml of water was added to a stirred mixture of Linters Cellulose (150 g) and 40 ml of water under a nitrogen atmosphere at 20° C. A solution of chloroacetic acid (75.6 g, 0.8 mole) in water (20 ml), n-butyl glycidyl ether (60 g, 0.4 mole), and Nafol®1214-2EO glycidyl ether (90 g, 0.22 mole) were added after 17 hours. The mixture was heated at 85° C. for 26 hours. The mixture was cooled and neutralized with 24 g (0.4 mole) acetic acid. The crude product was washed three times each with 65% ethanol, 80% ethanol, ethanol, and acetone, and was dried under reduced pressure at 70° C. for 24 hours. A white powder was obtained with the following analysis: $DS_{CM}$ 0.65 (72%), $MS_{BGE}$ 0-21 (47%), $MS_{FAE}$ 0.07 (28%), and a viscosity of 780 mPa·s.

EXAMPLE 3

A solution of sodium hydroxide (40 g, 1.0 mole) in 60 ml of water was added to a stirred mixture of Linters Cellulose (150 g), 40 ml of water, and n-butyl glycidyl ether (60 g, 0.4 mole) under a nitrogen atmosphere at 20° C. After 30 minutes the mixture was heated at 100° C. for 5 hours. The mixture was cooled and neutralized with acetic acid (60 g, 1.0 mole). The crude product was washed three times each with 65% ethanol, 80% ethanol, ethanol, and acetone, and was dried under reduced pressure at 70° C. for 24 hours. A white powder, i.e., BGEC, was obtained with the following analysis: $MS_{BGE}$ 0.23 (51%).

A solution of sodium hydroxide (40 g, 1.0 mole) in 60 ml of water was added to a stirred mixture of BGEC (154 g, 0.8 mole), 40 ml of water, and Nafol®1214-2EO glycidyl ether (80 g, 0.2 mole) under a nitrogen atmosphere at 20° C. After 30 minutes the mixture was heated at 100° C. for 5 hours. The mixture was cooled and neutralized with acetic acid (60 g, 1.0 mole). The crude product was washed three times each with 65% ethanol, 80% ethanol, ethanol, and acetone, and was dried under reduced pressure at 70° C. for 24 hours. A white powder, i.e., BGE/FAEC, was obtained with the following analysis: $MS_{BGE}$ 0.23 (51%) and $MS_{FAE}$ 0.14 (56%). This product subsequently was carboxymethylated using a three-necked roundbottom flask instead of the Drais mixer.

A solution of sodium hydroxide (17.2 g, 0.43 mole) in 26 ml of water was added to a stirred mixture of BGE/FAEC (26.4 g, 0.11 mole) in 1 l of isopropyl alcohol and 50 ml of water under a nitrogen atmosphere at 20° C. After 90 minutes a solution of chloroacetic acid (15.6 g, 0.165 mole) in 20 ml of isopropyl alcohol was added. The mixture was heated at 65° C. for 1 hour and at 80° C. for 2 hours, cooled and neutralized with acetic acid (6 g, 0.1 mole). The crude product was washed three times each with 65% ethanol, 80% ethanol, ethanol, and acetone and was dried under reduced pressure at 70° C. for 24 hours. A white powder was obtained with the following analysis: $DS_{CM}$ 0.99 (66%), $MS_{BGE}$ 0.23 (51%), and $MS_{FAE}$ 0.14 (56%). The product swells but is insoluble in water.

EXAMPLE 4

A solution of sodium hydroxide (28 g, 0.7 mole) in 28 ml of water was added to a stirred mixture of carboxymethyl cellulose (179 g) with a degree of carboxymethyl substitution of 0.19, n-butyl glycidyl ether (41.9 g, 0.3 mole), tetradecyl-penta-oxyethyl glycidyl ether (61.3 g, 0.1 mole), and 103 ml of water under a nitrogen atmosphere at 20° C. After 1 hour the mixture was heated at 100° C. for 5 hours. The mixture was then cooled and taken up in 2 l of 65% aqueous ethanol and neutralized with acetic acid. The crude product was filtered and washed with 65% ethanol, 80% ethanol, 80% acetone, and acetone, and dried under reduced pressure at 90° C. for 24 hours. An off-white powder was obtained with the following analysis: $DS_{CM}$ 0.19, $MS_{BGE}$ 0.19 (63%), $MS_{FAE}$ 0.039 (39%).

COMPARATIVE EXAMPLE C

A solution of sodium hydroxide (52 g, 1.3 moles) in 52 ml of water was added to a stirred mixture of cellulose (168 g), tetradecyl-penta-oxyethyl glycidyl ether (122.6 g, 0.2 mole) and 75 ml of water under a nitrogen atmosphere at 20° C. After 45 minutes the mixture was heated at 100° C. for 4 hours. The mixture was cooled and taken up in 2 l of 65% aqueous ethanol and neutralized with acetic acid. The crude product was filtered and washed with 65% ethanol, water, 80% ethanol, ethanol, and acetone, and dried in a fluid bed dryer. An off-white powder was obtained with the following analysis: $MS_{FAE}$ 0.01 (5%).

EXAMPLE 5

A solution of sodium hydroxide (52 g, 1.3 moles) in 52 ml of water was added to a stirred mixture of cellulose (168 g), 2-butoxyethyl glycidyl ether (BEGE) (58.6 g, 0.3 mole) tetradecyl-penta-oxyethyl glycidyl ether (61.3 g, 0.1 mole) and 75 ml of water under a nitrogen atmosphere at 20° C. After 90 minutes the mixture was heated at 100° C. for 4 hours. The mixture was cooled and taken up in 2 l of 65% aqueous ethanol and neutralized with acetic acid. The crude product was filtered and washed with 65% ethanol, water, 80% ethanol, ethanol, and acetone, and dried under reduced pressure at 70° C. An off-white powder was obtained with the following analysis: $MS_{BEGE}$ 0.14 (47%), $MS_{FAE}$ 0.025 (25%). This product was subsequently carboxymethylated using the procedure described in Example 3.

EXAMPLE 6

Preparation of Benzyl Carboxymethyl Cellulose

A solution of sodium hydroxide (148 g, 3.7 moles) in 148 ml of water was added to a stirred mixture of linters cellulose (205 g) and benzyl chloride (467 g, 3.7 moles) under a nitrogen atmosphere at 20° C. A solution of chloroacetic acid (116.6 g, 1.23 moles) in 30 ml of water was added after 4 hours. The mixture was heated at 90° C. for 5 hours. The mixture was cooled and taken up in 2.5 l of 65% aqueous ethanol and neutralized with acetic acid. The crude product was filtered and washed with 65% ethanol, 80% ethanol, ethanol, and acetone, and dried in a fluid bed dryer at 70° C. A white powder was obtained.

Preparation of Hydrophobically Modified Benzyl Carboxymethyl Cellulose

A solution of sodium hydroxide (32 g, 0.8 mole) in 48 ml of water was added to a stirred mixture of benzyl carboxymethyl cellulose (200 g) and a mixture of dodecyl and tetradecyl-bis-oxyethyl glycidyl ether (61.6 g 0.15 mole) under a nitrogen atmosphere at 20° C. After 60 minutes the mixture was heated at 100° C. for 4 hours. The mixture was cooled and neutralized with acetic acid. The crude product was taken up in 2 l of 65% aqueous ethanol, filtered, and washed with 65% ethanol, 80% ethanol, and acetone, and dried under reduced pressure at 70° C. A white powder was obtained.

EXAMPLE 7

About 38% of a solution of sodium hydroxide (104 g, 2.6 moles) in 156 ml of water was added to a stirred mixture of cellulose (150 g), n-butyl glycidyl ether (30 g, 0.22 mole), a mixture of dodecyl and tetradecyl glycidyl ether (40 g, 0.15 mole), and 50 ml of water under a nitrogen atmosphere at 20° C. After 60 minutes the mixture was heated at 100° C. for 4 hours. The mixture was cooled and 250 ml of ethanol, the remaining 62% of the sodium hydroxide solution, and a solution of chloroacefic acid (104 g, 1.1 moles) in 25 ml of water were added. The mixture was heated at 80° C. for 2 hours, cooled, and neutralized with acetic acid (24 g, 0.4 mole). The crude product was washed three times each with 65% ethanol, 80% ethanol, ethanol, and acetone, and was dried under reduced pressure at 70° C. A white powder was obtained with the following analysis: $DS_{CM}$ 0.84 (69%), $MS_{BGE}$ 0.09 (37%), $MS_{FAE}$ 0.019 (11%).

EXAMPLE 8

About 33% of a solution of sodium hydroxide (104 g, 2.6 moles) in 156 ml of water was added to a stirred mixture of cellulose (150 g), n-butyl glycidyl ether (30 g, 0.22 mole), and 50 ml of water under a nitrogen atmosphere at 20° C. After 60 minutes the mixture was heated at 100° C. for 1 hour. A mixture of hexadecyl- and octadecyl-bis-oxyethyl glycidyl ether (30 g, 0.06 mole) was added to the hot reaction mixture and heated at 100° C. for another 4 hours. The mixture was cooled and 250 ml of ethanol, the remaining 67% of the sodium hydroxide solution, and a solution of chloroacetic acid (104 g, 1.1 moles) in 25 ml of water were added. The mixture was heated at 80° C. for 2 hours, cooled, and neutralized with acetic acid (24 g, 0.4 mole). The crude product was washed three times each with 65% ethanol, 80% ethanol, ethanol, and acetone, and was dried under reduced pressure at 70° C. A white powder was obtained with the following analysis: $DS_{CM}$ 0.87 (71%), $MS_{BGE}$ 0.043 (27%), $MS_{FAE}$ 0.012 (18%) and a viscosity of 416 mPa·s.

What is claimed is:

1. A hydrophobically modified anionic cellulose ether obtainable by a process comprising reacting an alkali metal cellulose with at least three alkylating reagents A, B, and C, one or more reagents A being a haloacetic acid, alkali metal haloacetate, alkali metal vinyl sulfonate, or vinyl sulfonic acid, one or more reagents B having the formula

$$R^1-(OCH_2CH(R^2))_n-P$$

wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula

$$R^3-(OCH_2CH(R^2))_m-P$$

wherein $R^3$ represents a $C_8$–$C_{30}$ group, m is 0–10, and $R^2$ and P have the meaning as described above; and wherein the alkali metal cellulose is reacted first with reagent B followed by reaction with reagent C or the alkali metal cellulose is reacted first with a mixture of reagents B and C.

2. The cellulose ether according to claim 1, wherein reagent A consists essentially of chloroacetic acid.

3. The cellulose ether according to claim 1, wherein P is a glycidyl ether group.

4. The cellulose ether according to claim 1, wherein reagent B is butyl glycidyl ether.

5. The cellulose ether according to claim 1, wherein $R^3$ is a $C_{12}$–$C_{22}$ group.

6. The cellulose ether according to claim 1, wherein reagent C is dodecyl glycidyl ether, tetradecyl glycidyl ether, hexadecyl glycidyl ether, octadecyl glycidyl ether, dodecyl-bis-oxyethyl glycidyl ether, tetradecyl-bis-oxyethyl glycidyl ether, hexadecyl-bis-oxyethyl glycidyl ether, octadecyl-bis-oxyethyl glycidyl ether, tetradecyl-penta-oxyethyl glycidyl ether, or a mixture thereof.

7. The cellulose ether according to claim 1, wherein the alkali metal cellulose is reacted with reagents A, B, and C while gradually increasing the temperature.

8. The cellulose ether according to claim 1, wherein the process is carried out using a minimal amount of a diluent.

9. The cellulose ether according to claim 1, wherein the process further comprises reacting the alkali metal cellulose with an alkylating reagent D, and D is a quaternary ammonium compound.

10. The cellulose ether according to claim 1 in the form of a protective colloid, stabilizer, emulsifier, thickener, or rheology modifier.

11. A hydrophobically modified anionic cellulose ether obtainable by a process comprising reacting an alkali metal cellulose not carrying a hydroxyalkyl group with at least three alkylating reagents A, B, and C, one or more reagents A being a haloacetic acid, alkali metal haloacetate, alkali metal vinyl sulfonate, or vinyl sulfonic acid, one or more reagents B having the formula

$$R^1-(OCH_2CH(R^2))_n-P$$

wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula $$R^3\text{—}(OCH_2CH(R^2))_m\text{—}P$$

wherein $R^3$ represents a $C_8$–$C_{30}$ group, m is 0–10, and $R^2$ and P have the meaning as described above; and wherein the alkali metal cellulose is reacted first with reagent B followed by reaction with reagent C or the alkali metal cellulose is reacted first with a mixture of reagents B and C.

12. A process of making a hydrophobically modified anionic cellulose ether comprising reacting an alkali metal cellulose with at least three alkylating reagents A, B, and C, one or more reagents A being a haloacetic acid, alkali metal haloacetate, alkali metal vinyl sulfonate, or vinyl sulfonic acid, one or more reagents B having the formula $$R^1\text{—}(OCH_2CH(R^2))_n\text{—}P$$

wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula $$R^3\text{—}(OCH_2CH(R^2))_m\text{—}P$$

wherein $R^3$ represents a $C_8$–$C_{30}$ group, m is 0–10, and $R^2$ and P have the meaning as described above; and wherein the alkali metal cellulose is reacted first with reagent B followed by reaction with reagent C or the alkali metal cellulose is reacted first with a mixture of reagents B and C.

13. A process of making a hydrophobically modified anionic cellulose ether comprising reacting an alkali metal cellulose not carrying a hydroxyalkyl group with at least three alkylating reagents A, B, and C, one or more reagents A being a haloacetic acid, alkali metal haloacetate, alkali metal vinyl sulfonate, or vinyl sulfonic acid, one or more reagents B having the formula $$R^1\text{—}(OCH_2CH(R^2))_n\text{—}P$$

wherein $R^1$ represents a $C_2$–$C_7$ group, $R^2$ is hydrogen or a methyl group, n is 0–2, and P represents a glycidyl ether group, a 3-halo-2-hydroxypropyl ether group, a 1,2-epoxy group, or a halide, and one or more reagents C having the formula $$R^3\text{—}(OCH_2CH(R^2))_m\text{—}P$$

wherein $R^3$ represents a $C_8$–$C_{30}$ group, m is 0–10, and $R^2$ and P have the meaning as described above; and wherein the alkali metal cellulose is reacted first with reagent B followed by reaction with reagent C or the alkali metal cellulose is reacted first with a mixture of reagents B and C.

* * * * *

UNITED STATES PATENT AND TRADEMARK OFFICE
CERTIFICATE OF CORRECTION

PATENT NO.    : 6,627,751 B1
DATED         : September 30, 2003
INVENTOR(S)   : Batelaan et al.

It is certified that error appears in the above-identified patent and that said Letters Patent is hereby corrected as shown below:

<u>Title page,</u>
Item [73], Assignee: "Akko Nobel N.V.," should read -- Akzo Nobel N.V., --

Signed and Sealed this

Sixth Day of January, 2004

JAMES E. ROGAN
*Director of the United States Patent and Trademark Office*